United States Patent
Soryal et al.

(10) Patent No.: US 12,006,040 B2
(45) Date of Patent: *Jun. 11, 2024

(54) AUTONOMOUS AERIAL MANAGEMENT AS A SERVICE

(71) Applicant: AT&T Intellectual Property I, L.P., Atlanta, GA (US)

(72) Inventors: Joseph Soryal, Glendale, NY (US); Lalita V. Rao, Holmdel, NJ (US); Cristina Serban, Middletown, NJ (US); Naila Jaoude, Eatontown, NJ (US); Tony Hansen, South Amboy, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,906

(22) Filed: Mar. 10, 2023

(65) Prior Publication Data

US 2023/0227159 A1    Jul. 20, 2023

Related U.S. Application Data

(63) Continuation of application No. 16/056,076, filed on Aug. 6, 2018, now Pat. No. 11,634,220.

(51) Int. Cl.
*B64C 39/02* (2023.01)
*B64U 101/00* (2023.01)
*B64U 101/60* (2023.01)

(52) U.S. Cl.
CPC ........ *B64C 39/024* (2013.01); *B64U 2101/00* (2023.01); *B64U 2101/60* (2023.01); *B64U 2201/102* (2023.01)

(58) Field of Classification Search
None
See application file for complete search history.

(56) References Cited

U.S. PATENT DOCUMENTS

| | | |
|---|---|---|
| 8,914,182 B2 | 12/2014 | Casado et al. |
| 8,948,935 B1 | 2/2015 | Peeters et al. |
| 9,311,820 B2 | 4/2016 | Batla et al. |
| 9,454,151 B2 | 9/2016 | Srivastava et al. |
| 9,567,077 B2 | 2/2017 | Mullan et al. |
| 9,747,808 B2 | 8/2017 | Chambers et al. |
| 9,811,084 B2 | 11/2017 | Srivastava et al. |
| 9,847,032 B2 | 12/2017 | Postrel |
| 9,849,979 B2 | 12/2017 | Peeters et al. |
| 9,851,716 B2 | 12/2017 | Kugelmass |
| 9,910,432 B1 | 3/2018 | Chambers et al. |

(Continued)

FOREIGN PATENT DOCUMENTS

| | | |
|---|---|---|
| CN | 105825283 A | 8/2016 |
| CN | 105868835 B | 8/2021 |

(Continued)

OTHER PUBLICATIONS

"Drone", https://www.rapyuta-robotics.com/technology_drone, accessed Jun. 8, 2018, 4 pages.

(Continued)

*Primary Examiner* — Jeffrey C Boomer
(74) *Attorney, Agent, or Firm* — Guntin & Gust, PLC; Matthew Tropper (57) ABSTRACT

Autonomous unmanned aerial vehicle management service may provide a platform to manage groups of unmanned aerial vehicles to work together on a task simultaneously in an autonomous manner.

20 Claims, 6 Drawing Sheets

(56) References Cited

U.S. PATENT DOCUMENTS

| | | |
|---|---|---|
| 9,981,745 B2 | 5/2018 | Gil |
| 10,049,236 B1 | 8/2018 | Alkarmi et al. |
| 2010/0289633 A1 | 11/2010 | Angell et al. |
| 2016/0082460 A1 | 3/2016 | McMaster et al. |
| 2016/0246297 A1 | 8/2016 | Song |
| 2016/0250933 A1 | 9/2016 | Kim et al. |
| 2016/0257401 A1 | 9/2016 | Buchmueller et al. |
| 2016/0307449 A1 | 10/2016 | Gordon et al. |
| 2016/0357183 A1 | 12/2016 | Shaw |
| 2017/0023947 A1 | 1/2017 | Mcmillion |
| 2017/0211309 A1 | 7/2017 | Beauvais |
| 2017/0236428 A1 | 8/2017 | High et al. |
| 2017/0263131 A1 | 9/2017 | Blomberg et al. |
| 2017/0277203 A1 | 9/2017 | Castillo-effen et al. |
| 2017/0313421 A1 | 11/2017 | Gil |
| 2018/0004202 A1 | 1/2018 | Onaga et al. |
| 2018/0072415 A1 | 3/2018 | Cantrell et al. |
| 2018/0074518 A1 | 3/2018 | Cantrell et al. |
| 2018/0096609 A1 | 4/2018 | De La Cruz et al. |
| 2019/0031343 A1 | 1/2019 | Russell |
| 2019/0339416 A1 | 11/2019 | Elkabetz et al. |

FOREIGN PATENT DOCUMENTS

| | | |
|---|---|---|
| WO | 2017100579 A1 | 6/2017 |
| WO | 2018140050 A1 | 8/2018 |

OTHER PUBLICATIONS

Ermacora, Gabriele et al., "A cloud based service for management and planning of autonomous UAV missions in smart city scenarios", Int'l Workshop on Modelling and Simulation for Autonomous Systems, 2014, 7 pages.

Karasvirta, Jyrki, "Cloud4Drones platform enables live use of drone-collected data", EIT Digital IVZW, Apr. 2017, 3 pages.

Koubaa, Anis et al., "A Service-Oriented Cloud-Based Management System for the Internet-of-Drones", 2017 IEEE International Conf. on Autonomous Robot Systems and Competitions (ICARSC), Apr. 26-28, 7 pages.

Motlagh, Naser H. et al., "Low-Altitude Unmanned Aerial Vehicles-Based Internet of Things Services: Comprehensive Survey and Future Perspectives", IEEE Internet of Things Journal, vol. 3, No. 6, Dec. 2016, 24 pages.

AUTONOMOUS AERIAL MANAGEMENT AS A SERVICE

CROSS REFERENCE TO RELATED APPLICATION(S)

This application is a continuation of U.S. patent application Ser. No. 16/056,076, filed on Aug. 6, 2018. All sections of the aforementioned application(s) and/or patent(s) are incorporated herein by reference in their entirety.

BACKGROUND

Conventional remotely controlled air vehicles, often referred to as drones or unmanned aerial vehicles (UAVs), generally employ remote control operation or remote activation of vehicular self-control, e.g., autopilot, self-organized motion, self-implemented missions, etc. As an example, a consumer UAV product, such as a quad-copter, may be operated via remote control. As another example, a military UAV, such as a predator, global hawk, etc., may be operated from a control center located remotely from the UAV and may include instructions that direct the UAV to operate in an autonomous or semi-autonomous mode, such as self-guided flight between designated way points. As UAVs become more ubiquitous, intelligent management of UAVs becomes increasingly significant.

SUMMARY

Disclosed herein is the rental of autonomous unmanned aerial vehicles (UAVs) along with deployment and management options. Autonomous unmanned aerial vehicle management service may provide a platform to manage groups of UAVs to work together on a task simultaneously in an autonomous manner. The platform may include the use of a simplified graphical user interface, power management methods, navigation methods, or ways to gather and use analytics to gauge the efficiency of the service with real-time updates or after-work reports, among other things.

In an example, a server may include a processor and a memory coupled with the processor that effectuates operations. The operations may include obtaining a request for a service, the request includes a location for the service to be performed; determining that the service can be performed by a first unmanned aerial vehicle of a plurality of unmanned aerial vehicles; and based on determining that the service can be performed by the first unmanned aerial vehicle, sending instructions to at least one device to perform the service, wherein the at least one device includes the first unmanned aerial vehicle. The first unmanned aerial vehicle may be rented by a requestor of the service. The operations may further include: obtaining an alert that a threshold amount of a supply has been reached, wherein the threshold amount of supply is associated with battery power of the first unmanned aerial vehicle; and based on the alert, providing instructions to an autonomous vehicle to travel to the location, wherein the first unmanned aerial vehicle uses the autonomous vehicle to increase the supply above the threshold amount.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

UAVs may become a more widely accessible resource may take on a communal character or a rented character (e.g., community of rentable UAVs on a time sharing basis). For example, privately owned UAV (e.g., business or consumer owned) may be made available to others, such as publicly available (e.g., almost anyone), semi-publicly available (e.g., members of a group meeting a determined criteria), or shareable (e.g., one or more specifically designated people). White-list and black-list filtering may be employed to include or exclude users, or users associated with determined characteristics, histories, uses, etc.

Disclosed herein is the rental of autonomous unmanned aerial vehicles (UAVs) along with deployment and management options. Autonomous unmanned aerial vehicle management service may provide an efficient platform to manage groups of UAVs to work together on a single task (e.g., service) simultaneously in an autonomous manner. The platform may include the use of a simplified graphical user interface, power management methods, navigation methods, or ways to gather and use analytics to analyze the service to improve completion time, accuracy, or ease of use, among other things.

Figure 1:
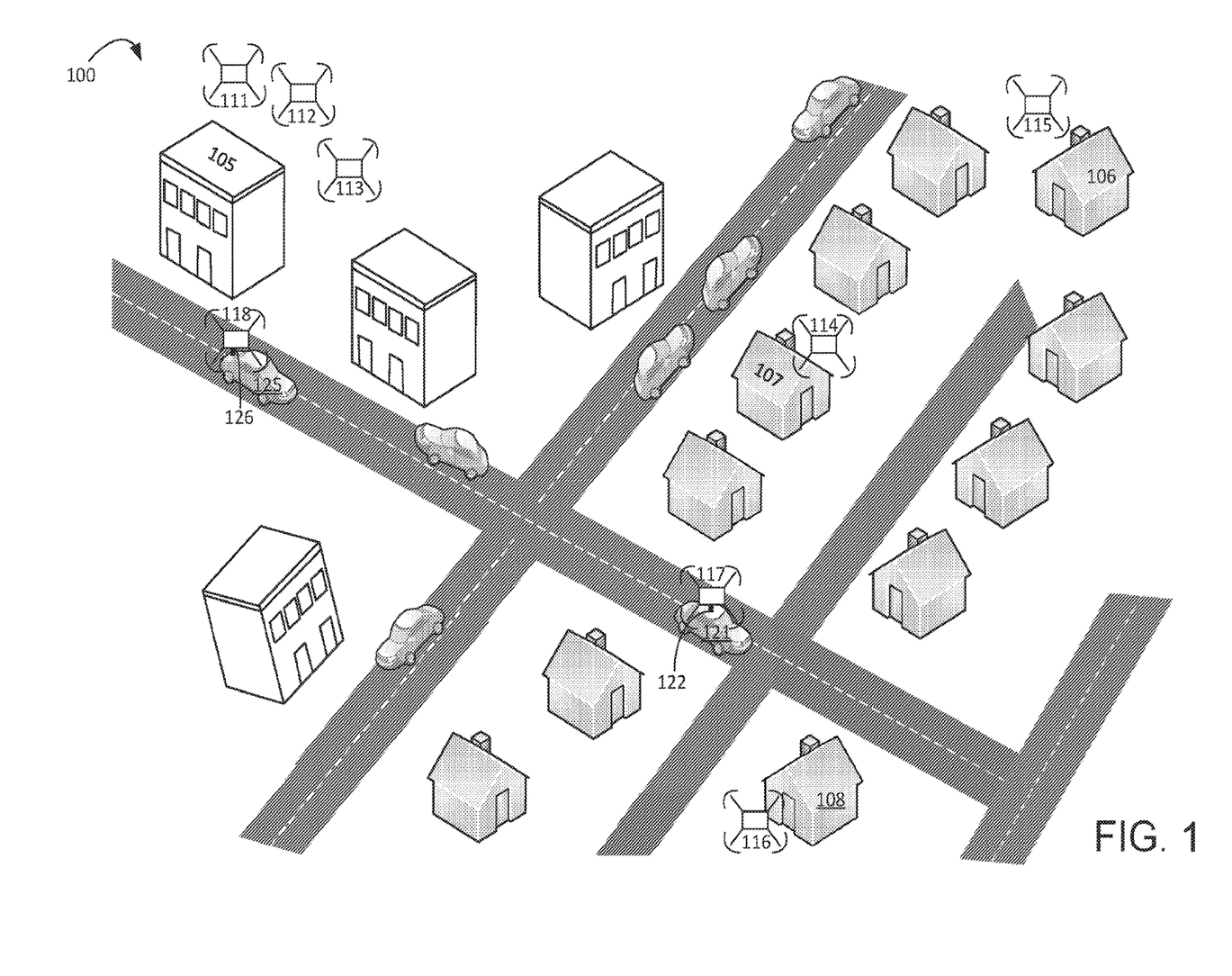
FIG. 1 illustrates an exemplary system that may implement an autonomous UAV management service.

FIG. 1 illustrates an exemplary system that may implement an autonomous UAV management service, as disclosed herein. System 100 includes UAV 111-UAV 118, vehicle 121, vehicle 125, home 106-home 108, and business 105 which may be communicatively connected with each other directly (e.g., peer-to-peer) or through network 101 (see FIG. 2). UAV 111-UAV 113 may be associated with business 105 and UAV 111-UAV 113 may be connected to a power source and network of business 105 at some time (t1). UAV 115 may be associated with home 106 (e.g., owned by a consumer) and UAV 115 may be connected to a power source and network of home 106 at some time (t1). UAV 116 and UAV 114 may be associated with home 108 and home 107, respectively, and UAV 116 and UAV 114 may be connected to a power source and network of home 108 and home 107, respectively, at some time (t1). Each device in system 100 may be communicatively connected with each other.

With continued reference to FIG. 1, it is contemplated that vehicle 121 (e.g., a terrestrial motor vehicle) and vehicle 125 may have connections (e.g., connections 122 and connections 126) to UAV 118 and UAV 117, respectively. As provided in more detail herein, it is contemplated that UAV 118 UAV 117 may not be owned by the owners of vehicle 121 and vehicle 125. Connections 122 and connections 126 may be used for power or communication to or through the respective vehicles.

Figure 2:
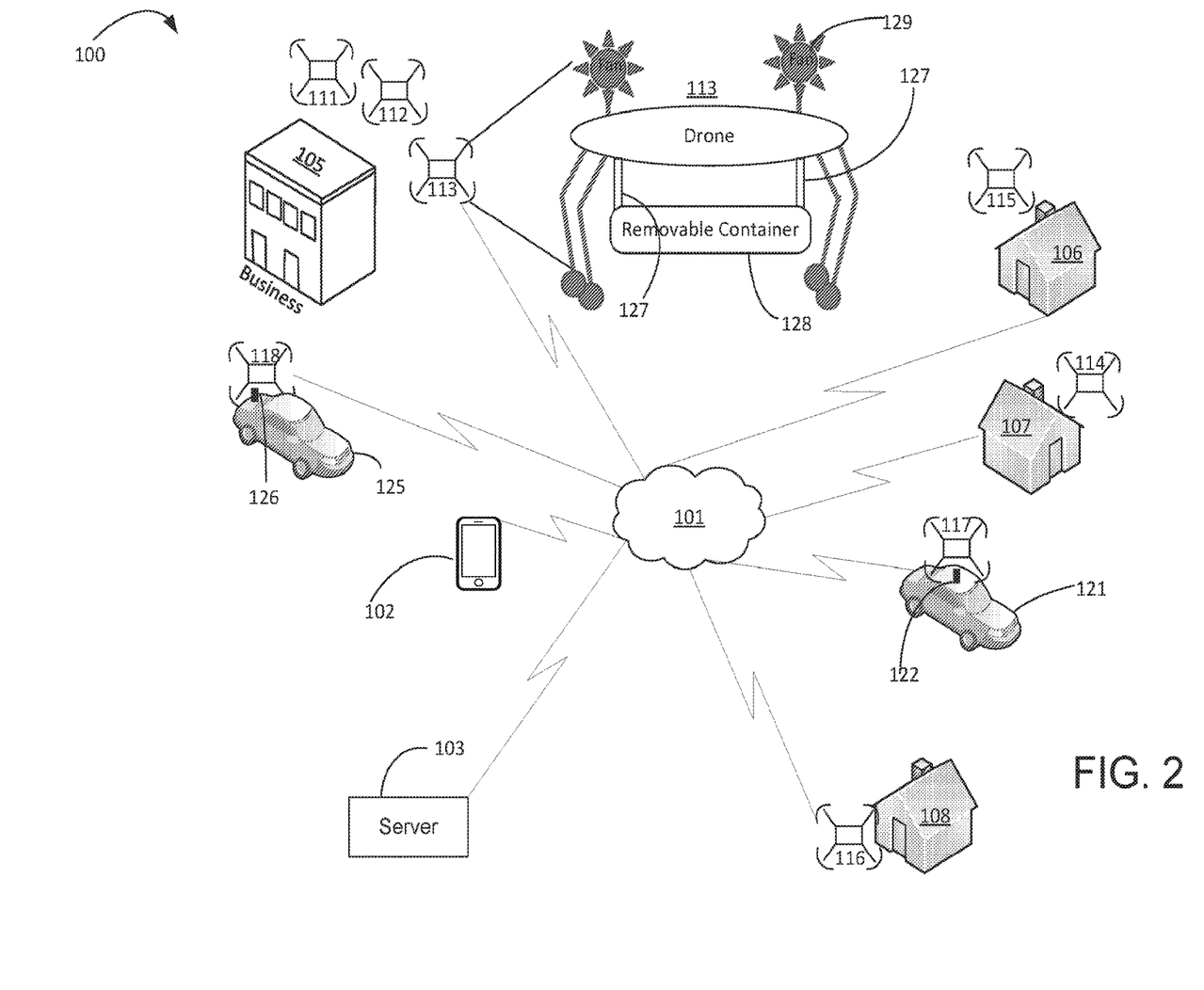
FIG. 2 illustrates devices that may communicate in a network to manage UAVs.

FIG. 2 is an exemplary illustration of devices that may communicate through or to network 101 in system 100 for the autonomous UAV management service. Device 102 may be an end user device (e.g., mobile device or desktop computer) that may be communicatively connected with network 101 and server 103. As discussed in more detail, device 102 may be used to request a service and server 103 may process the request. In FIG. 2, there is an exemplary zoomed in view of UAV 113. Removable containers 128 (e.g., re-attachable using magnets) may be on a platform that may be on vehicle 125, home 106, business 105, or the like. Removable container 128 may be connected with UAV 113 via lines 127. At the attachment point of line 127 and container 128 there may be a hook or latch that automatically attaches to removable container 128. Removable container 128 may be a service specific equipped container that may be attached to UAVs via lines 27 for various mechanisms for various services. For example, if the service is for spraying paint, then removable container 128 may be a fluid tank with nozzles to spray. If the service is for a surveillance type task, then removable container 128 may be a box equipped with cameras or other sensors, as disclosed herein. Removable container 128 may communicate its controllable parts (e.g., cameras, nozzles, etc.) or other mechanisms to the body of UAV 113. The communication may be wireless or through lines 127. UAV 113 may include fans 129 to cool UAV 113, help dry paint, or other functions.

Figure 3:
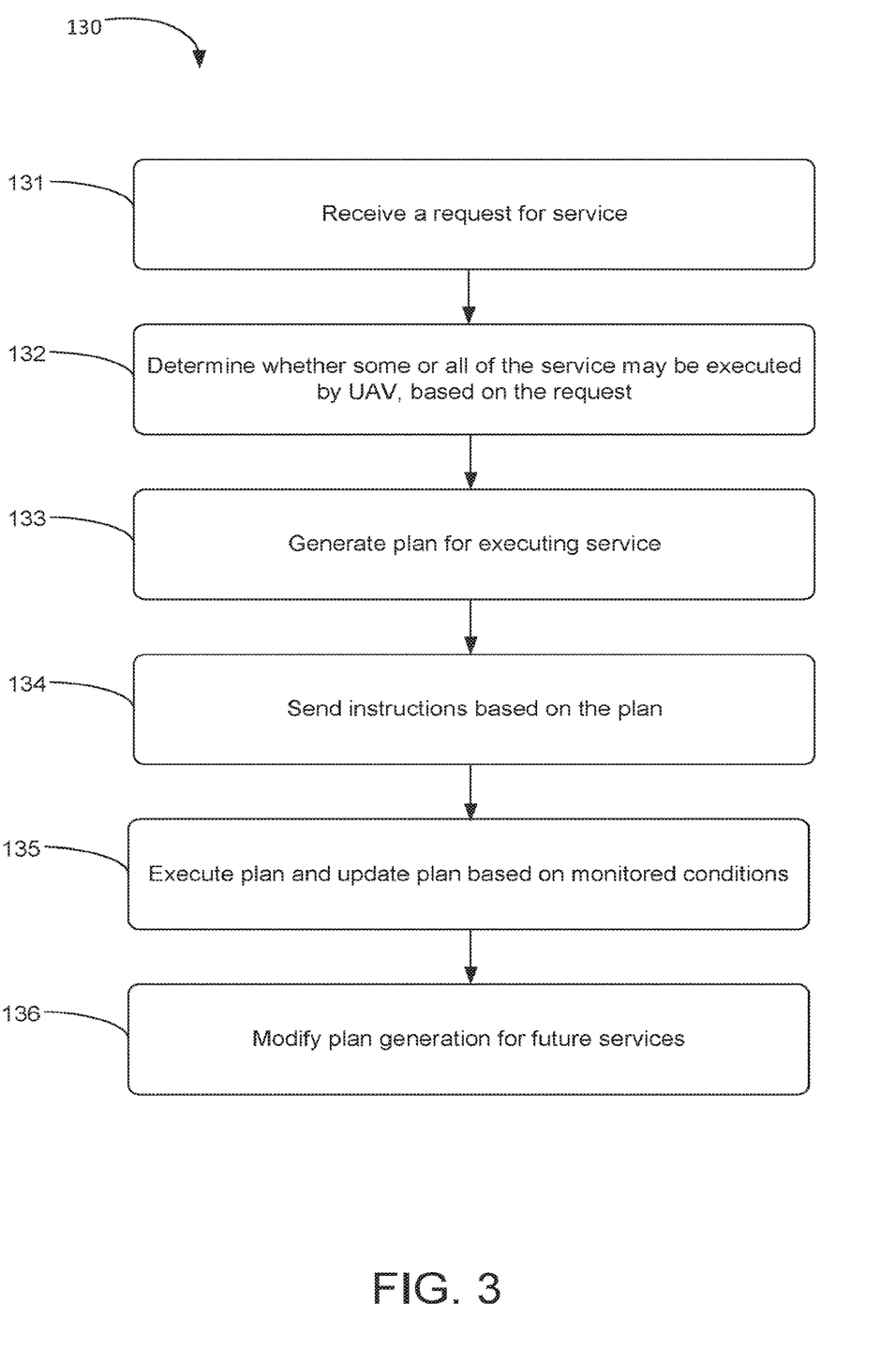
FIG. 3 illustrates an exemplary method for the autonomous UAV management.

FIG. 3 illustrates an exemplary method 130 for the autonomous UAV management service disclosed herein. In summary, at step 131, a request for a service may be received. At step, 132, based on the request of step 131, there may be a determination of whether some or all requests may be executed by a UAV. At step 133, based on the determination of step 132, a plan may be generated for executing the request service. At step 134, based on the plan of step 133, instructions may be sent to one or more devices (e.g., UAVs, end user devices, etc.) to execute the requested service. Further detail of method 130 is disclosed herein. At step 135, the received plan may be executed and then updated based on monitored conditions.

In an example, at step 131, a request for a service may be received by server 103 from device 102. Device 102 may have a user interface so a user of device 102 may select a service and provide other service information (e.g., different options) associated with the service. Exemplary services may include window washing, painting, light bulb replacement, search and rescue support, security monitoring, or emergency aid, among other things. For example, there may be a request for a painting service. Table 1 below shows exemplary information that may be entered by the user (or automatically populated based on historical information or other entered service information) for completing the painting service. As shown in Table 1, the painting service may need service information with regard to location for the service (e.g., exterior wall or shutter to be painted), credentials that authorize the service to be executed (e.g., credentials that verify ownership of home), estimated completion date of service, paint color, paint sheen, or UAV usage for completion (e.g., percentage of service completed by UAV), among other things. Coordinates may be inserted for location but may not be user friendly for an average consumer.

There may be an option with the user interface of device 102 to provide a street view or satellite view that may allow a user to zoom and select an appropriate structure (e.g., wall or shutter of a home) without entering numerical values for coordinates.

TABLE 1

| Painting Service |
|---|
| Location |
| Authorization |
| Estimated Completion Date |
| Paint Color |
| Paint Sheen |
| UAV Usage for Completion |
| Cost |

With continued reference to FIG. 3, at step 132, there may be a determination of what percentage of the service may be executed by a UAV (e.g., UAV Usage for Completion in Table 1) based on the request of step 131. In an example regarding the painting service, it may be found that based on the service information (e.g., location and required completion date) there may be a need for a person to paint an unusual corner. Therefore, the UAV Usage for Completion percentage may be 95% in this example of the painting service. If the location remains the same, but the required completion date changes, then a UAV may be able to complete 100% because a UAV with the necessary features (e.g., appropriate algorithm or mechanical mechanisms) may be available at a later date.

Based on step 132 or step 131, at step 133, a plan for executing the service may be generated. As disclosed herein, it is contemplated that the service may be executed based on a community of rentable UAVs (e.g., UAV 111-UAV 118 of FIG. 1) that may be used according to time sharing. In an example, the painting service may be for home 106. Home 106 may already have UAV 115 (e.g., UAV 115 may be owned by owner of home 106), but there may not be the necessary painting attachment on UAV 115 or number of UAVs to complete the request of step 131 without additional assistance. After consideration of multiple factors, such as location (e.g., threshold radius around home 106), UAV attachment (e.g., painting attachment arm or supply), or power (e.g., battery life), multiple UAVs may be chosen, such as UAV 113 associated with (e.g., owned by a person of) business 105, UAV 114 associated with home 107, UAV 116 associated with home 108, and UAV 117 associated with vehicle 125.

Once the UAVs have been chosen, a plan may be generated to determine how the service may be executed on site. The autonomous UAV management service may determine how it will manage the power (e.g., battery powered, gas powered, etc.) of the UAVs. For example, a certain amount of power of the UAV (e.g., 10% of fuel reserved) may be held in reserve in order to allow UAV 113, for example, to return to its home location (e.g., business 105 or passing vehicle 121). UAV 113 may stop executing the service and return, stop executing the service and recharge via solar power or other power source (e.g., vehicle 121), or the like. The autonomous UAV management service may monitor the health of each UAV (e.g., regular and sudden maintenance needs which may include the battery level). In case the power level is low, the management platform may instruct the UAV to find the nearest power station (e.g., the UAV may return to a base station or communicate with the device of the user (e.g., customer) to provide power to the UAV via a universal power cord and outlet).

There may need to be special coordination of UAVs. Each UAV may not arrive at the same time. For example, it may be determined that UAV 116 and UAV 117 should arrive at home 106 first to put on a first coat of paint while UAV 113 and UAV 114 may arrive at an appropriate threshold time afterwards so that a second coat may be effectively put on. The determination the UAV and subsequent arrival time may be based on the location of UAV or other factors, such as designated period UAV 114 is available for rent. Additional planning coordination between UAVs at the site may be needed to avoid collisions. It is contemplated and discussed in more detail herein that the plan for executing the service may include a travel plan to the destination service and back the appropriate home or business. It is also contemplated that business 105, home 107, or the like, may not primarily make money off of UAVs, but primarily use UAVs to service their own business or for personal activities.

At step 134, the plan of step 133 may be sent to the necessary participating devices. For example, if UAVs will complete 90% of the plan, terrestrial autonomous vehicles may complete 5% of the plan, and 5% of the plan by a person (e.g., provide the time and service information to a device of the person). At step 135, the plan may be executed and updated based on monitored conditions, such as weather or people. Sensors may include, location sensors (e.g., GPS), collision sensors (e.g., sensors for autonomous collision avoidance with other moving object, such as birds or cranes), cameras, or weather sensors (e.g., humidity, temperature, light, wind speed, rain, or snow). Pictures or videos of the location before, during, or after the executed service may be taken. Weather information may be determined based on information from websites, based on sensors on the UAVs, or based on sensors on other devices (e.g., mobile device 102 or home 106), among other things. In an example, a sensor of UAV 116 may detect wind gusts and UAV 116 may determine that it should check a website weather forecast for the area to determine whether to continue the service (e.g., because the offending weather may pass soon) or abort the service for another day.

At step 136, plan generation of step 133 or UAV choice of step 132 may be modified based on data collected during the service in order to improve the service. The data collected during the service may include number of UAVs for the service (e.g., generally or a subset of tasks for the service), time spent for the service, or problems detected (e.g., error codes or incomplete service that may have been indicated by a survey), among other things. The collected data may be used to optimize the number of UAVs recommended per task or the algorithms to control (coordinate) the UAVs, among other things.

With further reference to step 133 of FIG. 3, it is contemplated that a travel plan from the respective places of the UAVs to the site of service (e.g., home 106) may be needed. Below are additional details and scenarios. In a first scenario, a service provider may have a terrestrial vehicle or aerial vehicle (e.g., vehicle 121 or vehicle 125), sent proximate to the location of the site of service. In an example, the autonomous UAV management service (e.g., located on server 103) may have received a plurality of requests for UAV services. There may be a comparison of the requests to determine a place to drop off UAVs (e.g., UAV 118 and UAV 113) or a place to pick up UAVs (e.g., UAV 114 and UAV 117) to help with efficiency related to power management of the UAVs, weather conditions, etc. The drop off place or pickup place may be a site of service or origin site (e.g., business 105 that owns UAV site 113). It is contemplated that vehicle 121 and vehicle 125 may be autonomous vehicles that may traverse an area in a way to serve as transportation, power, or attachment station (e.g., extra paint or painting attachment, camera attachment, etc.). The navigation of the autonomous vehicle may be dictated by one or more services being monitored.

With continued reference to step 133, a second scenario, UAVs may participate in a ride share type service. As disclosed herein, vehicle 125 may include a plurality of connections (wired or wireless) for UAVs. In an example, vehicle 125 may be driven autonomously or driven by an individual consumer (or business person) to normal activities (e.g., pickup kids from school, to a grocery store, or deliver packages to a business). The owners (or agent thereof) of vehicle 125 may designate vehicle 125 as available for one or more UAVs (e.g., UAV 117) to attach to connections 126 during a period. UAV 117 may attach to vehicle 125, while parked, while temporarily stopped at a light, in motion, or the like. The autonomous UAV management service may determine that vehicle 125 is a candidate for UAV 117 to rideshare to its site of service (e.g., home 106) based on different factors, such as historical or near real-time information from navigation devices attached to vehicle 125 or within vehicle 125 (e.g., a user using a navigation program on a mobile phone). In an example regarding this second scenario, autonomous UAV management service may use historical information of past navigation of a particular user (e.g., user in vehicle 125) or plurality of users (e.g., vehicles that have driven along a particular street are likely to travel for at least 5 miles north on the street). In another example with regard to this second scenario, autonomous UAV management service may use near-real time information of current navigation of users proximate to UAV 117 and then automatically attached based on previous authorization. In another example, autonomous UAV management service may send a request to a plurality of vehicles proximate to UAV 117 and one of the plurality of vehicles (e.g., vehicle 125) may respond to authorize attachment. The request from UAV 117 may include a requirement for vehicle 125 to alter its path for UAV 117 to efficiently arrive at its destination. The alerted path is envisioned that it may be slight (e.g., within a threshold of 5 minutes or 2 miles). It is contemplated that the user of vehicle 125 (e.g., owner or agent thereof) may be compensated for use of vehicle 125 for the connected (wired or wireless) period with UAV 117.

Generally, the autonomous UAV management service disclosed herein may offer new ways to expand or operate for independent or consolidated businesses. A community of UAVs, which may have relatively unrelated owners, may work together as a group in an autonomous manner for multiple tasks. The autonomous UAV management service may allow for cost effective access to configure UAVs. If a search or monitoring service is performed, UAVs may stream video or send frequent still pictures of the area proximate to the UAV. The autonomous UAV management service may require UAVs to communicate their coordinates continuously, in terms of GPS lat/long/altitude, distance to next UAV(s), wind speed as perceived by UAVs, etc. Using this data, the autonomous UAV management service may keep track of UAVs location in the area of the requested service area and with respect to each other, and alerts UAVs of any potential collisions or other issues.

The autonomous UAV management service may be used by individuals (e.g., consumers) or businesses for a specific period for a specific service. There may be multiple modules, such as individual or business modules. The autonomous UAV management service may expose application programming interfaces (APIs) so customers (e.g., users) of the autonomous UAV management service may develop applications if they wish to do so in case they need capabilities that do not exist on the management service. Users of the autonomous UAV management service may register for it and have access via a user portal (e.g., web service or mobile application), which may have drop down menus for types of functionality (e.g., UAVs for painting, providing temporary internet connectivity, providing enhanced signal strength by being a repeater in areas with poor signal strength, transporting goods, illuminate the path of a pedestrian on a walk home during the night, taking pictures, taking video, UAV taxi fleet, firefighters service, etc.). A UAV taxi fleet may be a service to carry a plurality of UAVs by UAVs, which may include details as disclosed with regard to step 133.

The autonomous UAV management service may have UAVs travel directly from a first assignment (e.g., paint home 106) to a second assignment (e.g., paint home 108) upon the completion of the service first assignment and does not have to go to owner's facility (e.g., business 105 or home 107)—the autonomous UAV management service may optimize the trips of each UAV based on conditions (e.g., factors), or the like that are disclosed herein. The autonomous UAV management service may have threshold alerts for supplies (e.g., removable container 128 may communicate it needs more or a different color paint), etc. When the supplies are running low or reach some other trigger (e.g., reaching a low—10%—threshold on paint, power low, fuel low, or need to exchange mechanisms to perform service), more may be sent via a UAV (e.g., removable container of UAV 113), vehicle 125 (e.g., removable containers on vehicle 125), or the like. In addition, the customer may be alerted of the low supply. Data collected during the service trips may be used in Machine Learning Algorithms to predict better need for the next trip.

The autonomous UAV management service modes of operation may include bring your own UAV aspect (if the customer has UAVs and needs only the management/operation capabilities), as well as UAV renting (if the customer wants to rent/share the UAVs as well). The owner or operator of the management system may ensure that the regulations (e.g., FCC, FAA, etc.) are observed and the system may be automatically updated (e.g., geographic no fly zones for airports or no flying during storms or when the wind speed exceeds certain limit). The service information of the request of step 131 may include a size category (small or large), flight range based on charge, lifting capability (e.g., object weight or shape), specialized (e.g., pollinating flowers or air quality sensors), consumables (e.g., color paint or other fluids), or cost. An exemplary UAV service may include party rentals. A rented UAV may be used tumble in the sky above at a child's birthday party. Other exemplary UAV services may include delivery of surprise gifts (e.g., flowers), lawn cutting, or cleaning services, among other things. Device 102 may be used to control rented UAVs. Server 103 may establish protocols to authorize control based on a period.

Figure 4:
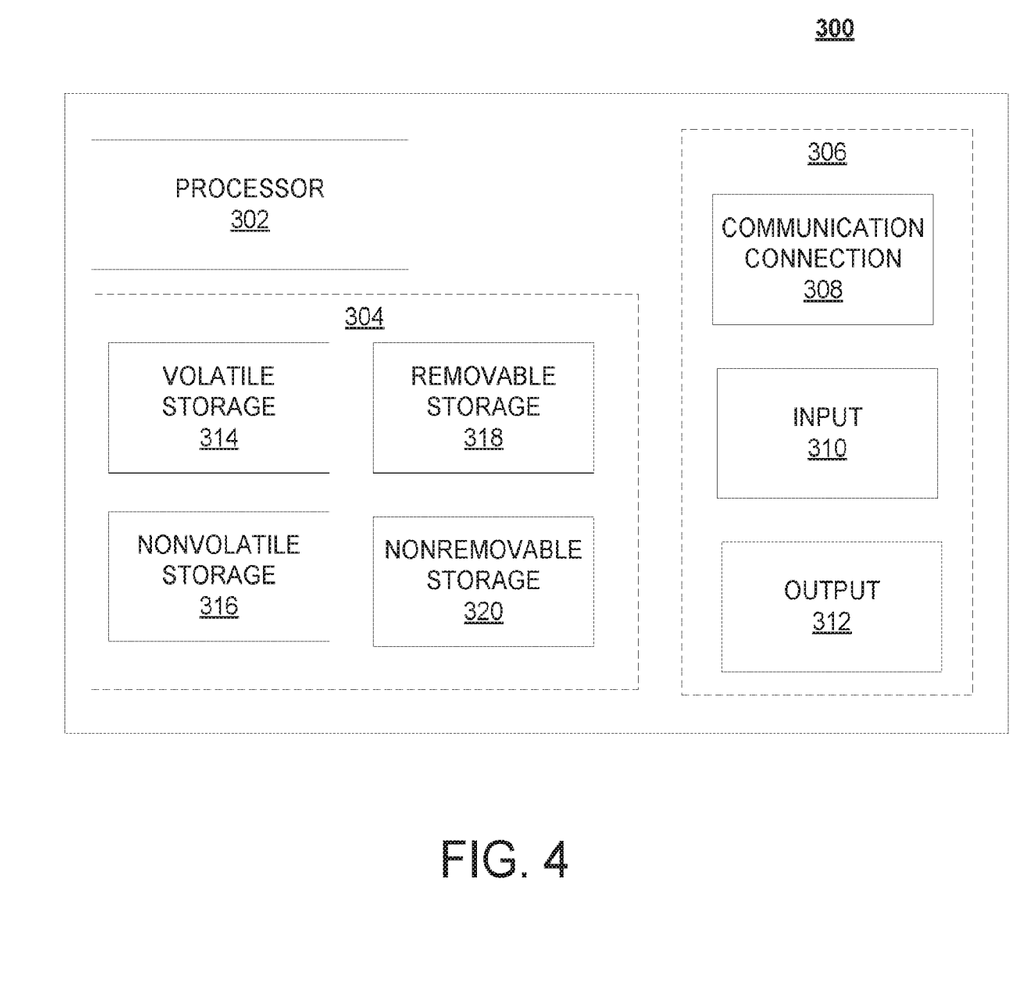
FIG. 4 illustrates a schematic of an exemplary network device.

FIG. 4 is a block diagram of network device 300 that may be connected to or comprise a component of system 100 or wireless network 600. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS/5G) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
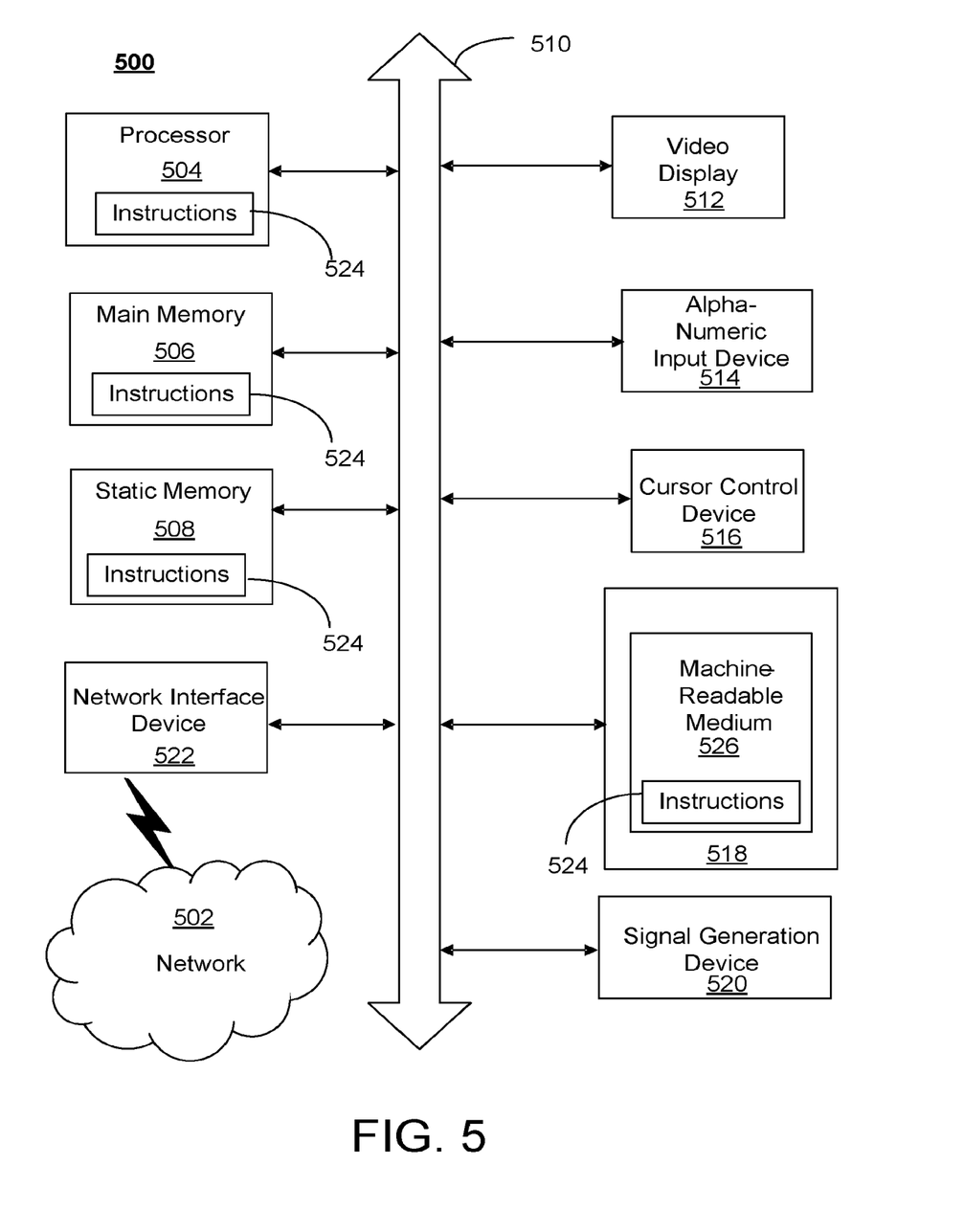
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UAV 111-UAV 118, vehicle 125, base station, and other devices of FIG. 1, FIG. 2, or FIG. 6. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 526 on which is stored one or more sets of instructions (e.g., software) embodying any one or more of the methods or functions described herein, including those methods illustrated above. Instructions 524 may also reside, completely or at least partially, within main memory 506, static memory 508, or within processor 504 during execution thereof by the computer system 500. Main memory 506 and processor 504 also may constitute tangible computer-readable storage media.

Figure 6:
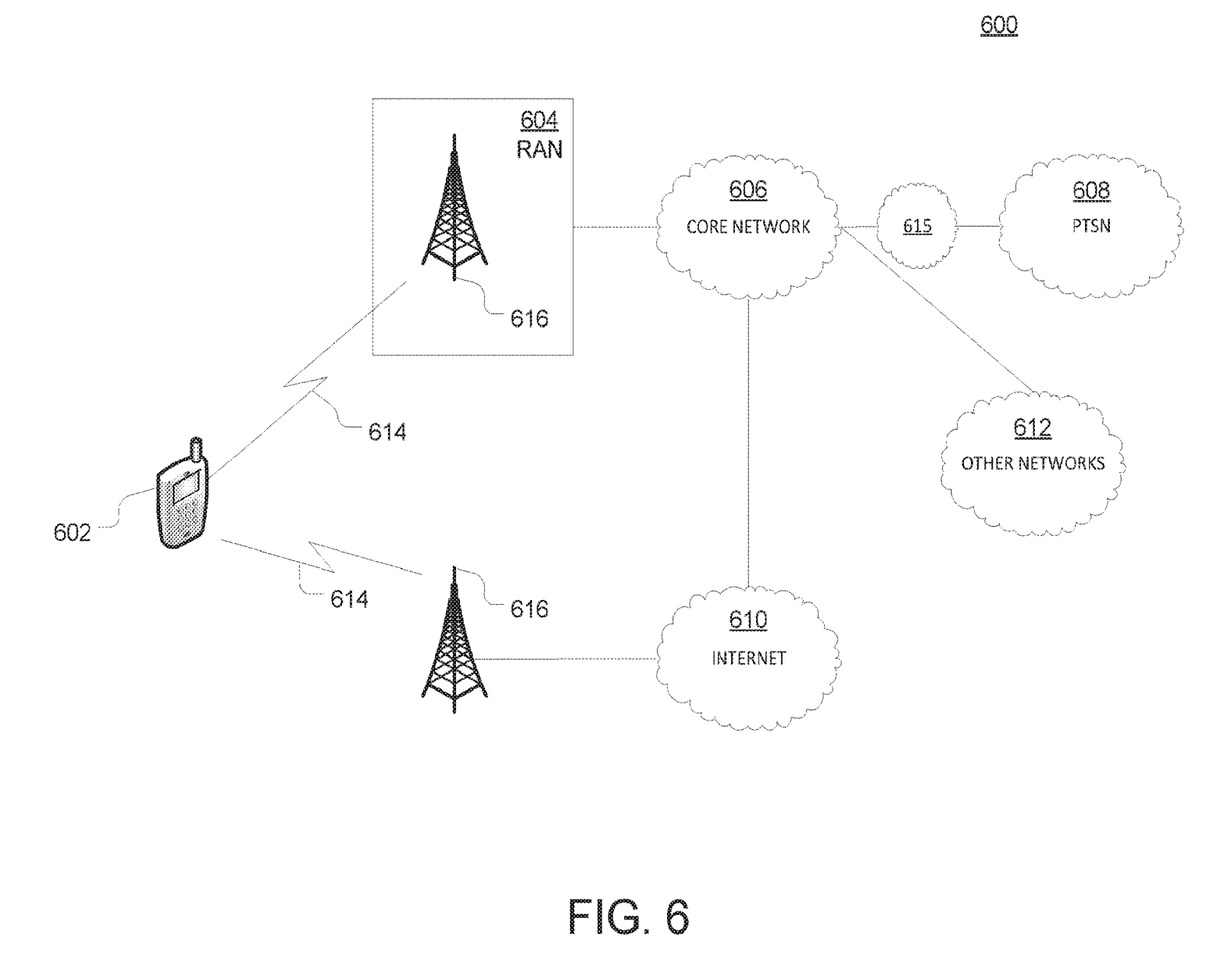
FIG. 6 illustrates an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise UAV 111-UAV 118, a mobile device 102, vehicle 125, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node-B, a Home eNode-B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

As an example, base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Base station 616 may be a wireless router, Home Node B, Home eNode B, gNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, 5G (e.g., new radio) etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which autonomous UAV management service can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—autonomous UAV management service—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims and may include other examples that occur to those skilled in the art (e.g., skipping steps, combining steps, or adding steps between exemplary methods disclosed herein). For example, the functions performed step 133 may occur at any point during the planning or performance of the service. Such other examples are intended to be within the scope of the claims if they have structural elements that do not differ from the literal language of the claims, or if they include equivalent structural elements with insubstantial differences from the literal languages of the claims.

A method, system, or apparatus for autonomous vehicle management may obtain (e.g., receive) a request for a service, the request may include a location for the service to be performed; determine that a percentage of the service may be performed by a first unmanned aerial vehicle of a plurality of unmanned aerial vehicles; based on determining that the percentage of the service may be performed by the first unmanned aerial vehicle, and send instructions to at least one device to perform the percentage of the service, wherein the at least one device comprises the first unmanned aerial vehicle. The first unmanned aerial vehicle may include a re-attachable container that comprises a mechanism to assist in the performance of the percentage of the service. The first unmanned aerial vehicle may not be owned by a requestor of the service. Owners of the plurality of unmanned aerial vehicles may allow for use of their UAVs based on a period designated by them. A method, system, or apparatus for autonomous vehicle management may analyze the request for the service to determine the lifting capability threshold for completing the percentage of the service; and select the first unmanned aerial vehicle to perform the service based on the analysis of the request for the service. Instructions may be sent to an autonomous vehicle to go to the service location. The autonomous vehicle may resupply the UAVs or transport a subset of the plurality of unmanned aerial vehicles to the location to perform the service, wherein the subset of the plurality of unmanned aerial vehicles comprises the first unmanned aerial vehicle. A method, system, or apparatus for autonomous vehicle management may obtain an alert that a threshold amount of a supply has been reached; based on the alert, provide (e.g., send) instructions to an autonomous vehicle to transport a plurality of re-attachable containers to the location for use by the first unmanned aerial vehicle to perform the service. A server or end user device (e.g., UAV) may perform any of the steps herein. A method, system, or apparatus for autonomous vehicle management may obtain an alert that a threshold amount of a supply has been reached, wherein the threshold amount of supply is associated with battery power of the first unmanned aerial vehicle; and based on the alert, provide instructions to an autonomous vehicle to travel to the location, wherein the first unmanned aerial vehicle uses the autonomous vehicle to increase the supply above the threshold amount (e.g., a second threshold that optimize completion time of service). All combinations in this paragraph and throughout are contemplated herein.

What is claimed:

1. A server comprising:
    a processor; and
    a memory coupled with the processor, the processor configured to execute computer-readable instructions stored in the memory, the computer-readable instructions stored in the memory comprising computer-readable instructions for:
        determining whether a non-zero portion of a service that had been requested can be performed by a first unmanned vehicle of a plurality of unmanned vehicles, wherein the first unmanned vehicle comprises one or more devices, wherein the one or more devices comprises a sensor, and wherein the determining results in a determination; and
        based on the determination being that the non-zero portion of the service can be performed by the first unmanned vehicle, providing instructions to the first unmanned vehicle to perform the non-zero portion of the service, the first unmanned vehicle determining, based on a weather condition that is detected by the sensor of the first unmanned vehicle, that the first unmanned vehicle should check a weather forecast for an area in which the first unmanned vehicle is located, the first unmanned vehicle checking the weather forecast via a website, the first unmanned vehicle further determining, based on the weather forecast, if the first unmanned vehicle should continue to perform the non-zero portion of the service or if the first unmanned vehicle should abort performance of the non-zero portion of the service.

2. The server of claim 1, wherein the first unmanned vehicle further comprises a re-attachable container.

3. The server of claim 1, wherein the one or more devices further comprise a paint dispenser.

4. The server of claim 1, wherein the first unmanned vehicle comprises an unmanned aerial vehicle, and wherein the computer-readable instructions are further for:
  analyzing a request for the service to determine a lifting capability threshold for completing the service; and
  selecting the unmanned aerial vehicle based on the analyzing of the request for the service.

5. The server of claim 1, wherein the plurality of unmanned vehicles comprises a plurality of unmanned aerial vehicles, wherein the first unmanned vehicle comprises a first unmanned aerial vehicle, wherein the computer-readable instructions are further for providing other instructions to an autonomous vehicle to transport a subset of the plurality of unmanned aerial vehicles to a location at which the service is to be performed, and wherein the subset of the plurality of unmanned aerial vehicles comprises the first unmanned aerial vehicle.

6. The server of claim 1, wherein the computer-readable instructions are further for providing other instructions to an autonomous vehicle to pick up a first re-attachable container of a plurality of re-attachable containers from a location at which the service is to be performed after a threshold amount of substance has been removed from the first re-attachable container of the plurality of re-attachable containers.

7. The server of claim 1, wherein the weather condition comprises a wind gust.

8. The server of claim 1, wherein in a case that the first unmanned vehicle should abort performance of the non-zero portion of the service, the first unmanned vehicle is sent to a designated place.

9. The server of claim 8, wherein the designated place is an origin site.

10. A system comprising:
  a first unmanned vehicle; and
  a server comprising:
    a processor; and
    a memory coupled with the processor, the processor configured to execute computer-readable instructions stored in the memory, the computer-readable instructions stored in the memory comprising computer-readable instructions for:
      determining whether a non-zero portion of a service can be performed by the first unmanned vehicle, wherein the service comprises at least one of window washing, painting, light bulb replacement, search and rescue support, security monitoring, and emergency aid, wherein the first unmanned vehicle is one of a plurality of unmanned vehicles, wherein the first unmanned vehicle comprises one or more devices, wherein the one or more devices comprises a sensor, and wherein the determining results in a determination; and
      based on the determination being that the non-zero portion of the service can be performed by the first unmanned vehicle, providing instructions to the first unmanned vehicle to perform the non-zero portion of the service, the first unmanned vehicle determining, based on a weather condition that is detected by the sensor of the first unmanned vehicle, that the first unmanned vehicle should check a weather forecast for an area in which the first unmanned vehicle is located, the first unmanned vehicle checking the weather forecast via a website, the first unmanned vehicle further determining, based on the weather forecast, if the first unmanned vehicle should continue to perform the non-zero portion of the service or if the first unmanned vehicle should abort performance of the non-zero portion of the service.

11. The system of claim 10, wherein the first unmanned vehicle comprises an unmanned aerial vehicle, and wherein the computer-readable instructions are further for:
  analyzing a request for the service to determine a lifting capability threshold for completing the service; and
  selecting the unmanned aerial vehicle based on the analyzing of the request for the service.

12. The system of claim 10, wherein the plurality of unmanned vehicles comprises a plurality of unmanned aerial vehicles, wherein the first unmanned vehicle comprises a first unmanned aerial vehicle, wherein the computer-readable instructions are further for providing other instructions to an autonomous vehicle to transport a subset of the plurality of unmanned aerial vehicles to a location at which the service is to be performed, and wherein the subset of the plurality of unmanned aerial vehicles comprises the first unmanned aerial vehicle.

13. The system of claim 10, wherein the computer-readable instructions are further for providing other instructions to an autonomous vehicle to pick up a plurality of re-attachable containers from a location at which the service is to be performed after a threshold amount of substance has been removed from a first re-attachable container of the plurality of re-attachable containers.

14. The system of claim 10, wherein the computer-readable instructions are further for:
  obtaining an alert that a threshold amount of a supply has been reached; and
  based on the alert, providing other instructions to an autonomous vehicle to transport a plurality of re-attachable containers to a location at which the service is to be performed for use by the first unmanned vehicle to perform the non-zero portion of the service.

15. A method comprising:
  determining, by a device, whether a non-zero portion of a service that had been requested can be performed by a first unmanned vehicle of a plurality of unmanned vehicles, wherein the first unmanned vehicle comprises a sensor, and wherein the determining results in a determination; and
  based on the determination being that the non-zero portion of the service can be performed by the first unmanned vehicle, providing, by the device, instructions to the first unmanned vehicle to perform the non-zero portion of the service, the first unmanned vehicle determining, based on a wind gust that is detected by the sensor of the first unmanned vehicle, that the first unmanned vehicle should check a weather forecast for an area in which the first unmanned vehicle is located, the first unmanned vehicle checking the weather forecast via a website, the first unmanned vehicle further determining, based on the weather forecast, if the first unmanned vehicle should continue to perform the non-zero portion of the service or if the first unmanned vehicle should abort performance of the non-zero portion of the service.

16. The method of claim 15, wherein the first unmanned vehicle comprises a re-attachable container.

17. The method of claim 15, further comprising determining, by the device, that the first unmanned vehicle can perform the non-zero portion of the service based on a threshold lifting capability to perform the service.

18. The method of claim 15, further comprising providing, by the device, other instructions to an autonomous vehicle to transport a subset of the plurality of unmanned vehicles to a location at which the service is to be performed, wherein the subset of the plurality of unmanned vehicles comprises the first unmanned vehicle.

19. The method of claim 15, further comprising providing, by the device, other instructions to an autonomous vehicle to transport a plurality of re-attachable containers to a location at which the service is to be performed for use by the first unmanned vehicle to perform the non-zero portion of the service.

20. The method of claim 15, wherein the first unmanned vehicle is an unmanned aerial vehicle, and wherein the method further comprises:
  obtaining, by the device, an alert that a threshold amount of a supply has been reached; and
  based on the alert, providing, by the device, other instructions to an autonomous vehicle to transport a plurality of re-attachable containers to a location at which the service is to be performed for use by the unmanned aerial vehicle to perform the non-zero portion of the service.

* * * * *